United States Patent [19]

Spiegl

[11] 4,332,678

[45] Jun. 1, 1982

[54] SYSTEM FOR THE SOFTENING OF WATER

[76] Inventor: Karl Spiegl, Landhausstr. 35, 7031 Aidlingen 2, Fed. Rep. of Germany

[21] Appl. No.: 130,501

[22] Filed: Mar. 14, 1980

[30] Foreign Application Priority Data

Mar. 20, 1979 [DE] Fed. Rep. of Germany ....... 2910869

[51] Int. Cl.³ .......................................... B01J 47/14
[52] U.S. Cl. ...................................... 210/86; 210/91; 210/94; 210/96.1; 210/104; 210/190
[58] Field of Search ................ 210/662, 85, 87, 96.1, 210/139, 140, 190, 191, 278, 86, 91, 93, 94, 104, 105

[56] References Cited

U.S. PATENT DOCUMENTS

| | | | |
|---|---|---|---|
| 3,159,573 | 12/1964 | Ritchie | 210/96.1 |
| 3,250,392 | 5/1966 | Luck | 210/96.1 |
| 3,477,576 | 11/1969 | Luck et al. | 210/96.1 |
| 3,479,864 | 11/1969 | Patterson | 73/64.3 |
| 3,512,643 | 5/1970 | Forss | 210/96.1 |
| 3,531,402 | 9/1970 | Thompson | 210/190 |
| 3,578,164 | 5/1971 | Weiss et al. | 210/96.1 |
| 3,928,200 | 12/1975 | Calmon | 210/96.1 |
| 4,104,165 | 8/1978 | Braswell | 210/191 |
| 4,158,628 | 6/1979 | Fleckensteim | 210/96.1 |

*Primary Examiner*—Ivars C. Cintins
*Attorney, Agent, or Firm*—Martin A. Farber

[57] ABSTRACT

A system for softening water comprising a regeneratable softener having an ion-exchange resin exposable to the water, a salt reservoir containing a supersaturated sodium-chloride solution for the regeneration of the resin, and a water hardness detector including a housing containing an ion-exchange shrink resin charge regeneratable by the solution, the shrink resin charge being exposable to water having passed through at least a part of the resin in the softener. The detector further includes a piston reciprocable within the tank, which piston contacts a single free surface of the shrink resin charge at least during detection of water hardness. The regeneration of the softener is initiated in response to the position of the piston.

23 Claims, 18 Drawing Figures

SYSTEM FOR THE SOFTENING OF WATER

This invention relates to a system for the softening of water having a regeneratable softener containing a synthetic ion-exchange resin; having a salt container containing a supersaturated solution of sodium chloride; having a multiway valve which is connected to inlet and outlet of the softener as well as to the salt container and to a waste-water line and is provided with a feed line for hard water and a discharge line for soft water; and having a regeneratable hardness detector which contains an ion-exchange shrink resin and the inlet of which is connected with an immersion filter lowered into the resin charge of the softener and within which the shape and/or height of a variable surface of the resin charge is determined as measure of the exhaustion of the softener.

In one system of this type known from German Unexamined Application for Patent DE-OS No. 20 17 303 (U.S. Ser. No. 818,763 of Apr. 23, 1969), the outlet of the hardness detector is connected with the waste-water line so that during the hardness testing which takes place automatically at night so-called test water flows in considerable quantities through the hardness detector and is lost for the supply of utility or drinking water. Furthermore, the determination of the shape and height of the free surface of the resin charge of the hardness detector is effected by means of a water-tight membrane which is clamped at its edge and is connected firmly at its center with the one end of a rigid rod which bears a coil spring one end of which acts on the membrane while the other end acts on the housing of the hardness detector, said rod being capable of switching the multiway valve purely mechanically.

The object of the present invention therefore is to create an improved system of the aforementioned type and which does not result in any loss of water and/or makes possible electric control of the multiway valve.

This purpose is achieved in accordance with the invention by providing a system for softening water comprising a regeneratable softener having an ion-exchange resin exposable to the water, a salt reservoir containing a supersaturated sodium-chloride solution for the regeneration of the resin, and a water hardness detector including a housing containing an ion-exchange shrink resin charge regeneratable by the solution, the shrink resin charge being exposable to water having passed through at least a part of the resin in the softener. The detector further includes a piston reciprocable within the tank, which piston contacts a single free surface of the shrink resin charge at least during detection of water hardness. The regeneration of the softener is initiated in response to the position of the piston. Advantageously the test water is fed to the storage together with the softened utility or drinking water. Accordingly, the hardness testing can be carried out continuously outside the regeneration phase so that the regeneration is not effected periodically, but rather, as required. Of course, provision can be made so that the regeneration does not start at the wrong time, but is shifted towards a time when no substantial consumption of water is to be expected.

In addition, the sensing in accordance with the invention affords the possibility of simplifying the construction of the hardness detector and/or adapting it in diversified fashion to the desired manner of control of the multiway valve.

The various embodiments and further developments of the system of the invention are described in their essential features below.

The outlet of the hardness detector is connected to a borehole in the housing of the multiway valve which discharges into an inlet of the valve which is connected with the outlet of the softener. In this way, with the hardness detector flanged onto the housing of the multiway valve, no special conduit is required between hardness detector and water supply.

In a system whose hardness detector has, in known manner, an annular shell comprising light transmitting material, and particularly transparent material, such material makes it possible to optically scan the height of the free surface of the resin charge in the hardness detector. In the case of transparent material, this can be done also by the naked eye.

In a system whose hardness detector is provided, as known, with conduit ends which dip into its resin charge as inlets and outlets, the conduit ends and the immersion filter are developed as slot filters. The entrance and discharge of the water through slots prevents the passage of the granular resin charge of the hardness detector if the slot width is less than the particle size.

A plurality of hardness detectors and a corresponding number of immersion filters are arranged at different heights in the softener. In this way the exhausting of the softener can be noted stepwise. There is thus provided an early warning system which can be made as rough or as fine as desired.

The resin charge in the hardness detector forms a tapered column on top. This has the result that upon the swelling of the resin charge as a result of regeneration, or the shrinking thereof upon the softening, the change in height of the free surface of the resin charge has become greater and therefore can be noted with correspondingly greater dependability and accuracy.

The hardness detector is provided with a light gate the light beam of which passes diametrally through a circular cylindrical shell or diagonally through a square-cylindrical shell. The light gate is interrupted by a piston which floats on the resin charge as it swells and is reestablished again after the piston descends when the resin charge is shrinking so that electric pulses for the controlling of the multiway valve can be derived directly from the barrier.

The hardness detector has a piston floating on its resin charge, which piston is vertically displaceable in opposite directions by the shrinking and swelling of the resin. In this way a basic condition is created for a number of possible embodiments of the hardness detector of the invention. By "floating" there is also covered a condition in which the piston rests horizontally, laterally or vertically from below on the resin charge. It is preferred, however, for the piston to rest on an upper free surface of the resin.

The piston can have at least one opening and preferably a plurality of slots. The hardness detector has with this piston a filter disk arranged below the resin charge of the detector and bearing said charge, this disk lying over the outlet of the detector while its inlet is arranged above the piston having the opening or slots. In this case the direction of flow from top to bottom prevents suspension of the resin charge, which is furthermore wetted in its entirety.

In a system whose hardness detector has a spring the return force of which is opposed to the swelling force of its resin charge, the spring acts on the piston. The action, for instance, of a coil spring on the piston has the result that the latter continuously follows the sinking free surface of the resin charge when the resin shrinks so that the position of the piston, which otherwise might remain back, cannot indicate too low a degree of exhaustion of the softener. Of course, the restoring force of the spring must be less than the swelling force of the resin charge of the hardness detector since the resin otherwise would itself compress and there would be no piston displacement.

The piston is shaped conically in order to compact the resin charge of the hardness detector. The frusto-conical shape of the piston results in a compacting of the resin, which prevents too extensive a penetration of the piston into the resin.

The piston has a sharp scraping edge on the end thereof facing the resin charge of the hardness detector. This edge prevents the penetration—which might be disturbing—of resin particles into the displacement path behind the piston. The piston is provided with a piston ring which seals the piston from the housing shell of the hardness detector and thus helps in preventing the passage of resin particles through the sealing slot formed by the two.

The piston is provided with a tapered plunger which dips into the resin charge of the hardness detector and may, for instance, bear an indicator color which by its emergence from the resin charge indicates that the piston is no longer floating on the resin charge.

The piston is a part of a telescopic tube and is hollow so that it weighs little and nevertheless is dependably guided.

The piston is developed in disk shape so that only a relatively small displacement space is required in the hardness detector.

The hardness detector has a substantially L-shaped rocker arm whose inner end lies loosely on the piston and whose outer end actuates the electric switch mechanically. The piston is coupled to a rocker arm in operative contact with a switch located outside the housing, which rocker arm, passes through a seal located in the housing shell of the hardness detector and pivoted in this case at a point at the place of passage.

The piston is connected with a permanent magnet which magnetically actuates a contact-free electric switch with which the hardness detector is provided. This switch is, of course, arranged outside the housing of the hardness detector and, in combination with the permanent magnet, eliminates the necessity of a housing lead-through, the sealing-off of which is always difficult.

The hardness detector has a piston rod the protruding end of which mechanically actuates an electric switch, this determining a basic arrangement for many possible embodiments. For the passage of piston rods through the housing the knowledge and skill in this field can be utilized. The switch of course, in the same manner as the switches just mentioned above, permits a follow-up control of the system.

The piston rod is magnetically coupled with the piston and for this purpose the rod and the piston are provided with an outer and an inner permanent magnet respectively. In this way, one even dispenses with a housing lead-through for the piston rod, since the two permanent magnets continuously carry each other along together if the material of the housing part of the hardness detector which lies between the magnets is non-magnetic.

A lift device is provided for the piston rod. This device makes it possible to hold the piston separated, during the softening phase and/or the regenerating phase, from the resin charge of the hardness detector and to place it on the resin charge for a brief time solely for test purposes.

The lift device has a movable control cam and a control projection which cooperates with it and is fastened on the piston rod. This cam mechanism can have a straight edge which is movable linearly back and forth as control cam and a pin as control projection so that it can be constructed in simple manner.

The lift device has a rotatable eccentric and a connecting frame which cooperates with it and is rigidly connected to the piston rod. This control mechanism has the advantage that instead of a reciprocating motion a turning motion of the eccentric can be utilized directly, and this turning motion can be derived in simple manner from a clock.

The lift device has an electromagnet with a displaceable armature which is firmly connected with the piston rod. This development will only be utilized if the piston is to be raised temporarily from the resin charge of the hardness detector since the electromagnet would otherwise have to be continuously energized, with the known detrimental consequences. The use of the lift magnet is therefore limited to the regeneration phase.

The lift device has a water-tight membrane fastened centrally to the piston rod and peripherally to an additional housing connected with the hardness detector and to a connecting line connected on the side of the membrane facing away from the piston to the air-tight additional housing, said line discharging within the valve housing into a line which leads from the salt container to the softener. When salt solution flows in the last-mentioned line past the mouth of the connecting line, a vacuum is produced, in accordance with the principle of a water jet pump, in the connecting line, and thus on the one side of the membrane, thereby causing a deflection of the membrane and a lifting of the piston. This takes place at the start of the regeneration phase, which does not coincide with the start of the swelling process in the resin charge of the hardness detector, which takes place all the later the further the immersion filter belonging to the hardness detector is from the initially regenerated zone of the resin charge of the softener.

The hardness detector is provided with a contact-less switch which can be capacitively actuated by the piston. This development does not require even a permanent magnet which is coupled with the piston.

In a system whose multi-way valve has, as is known, an outlet valve in the vicinity of the connection of the waste-water line, the outlet of the hardness detector is connected to a borehole in the housing of the multi-way valve, which hole discharges in the vicinity of the outlet valve towards the waste water line. This borehole can even be provided subsequently on the housing of an ordinary commercial multi-way valve.

The hardness detector is developed as an immersion unit which is lowered into the resin charge of the softener. Accordingly, no water lines are used to connect the hardness detector on the one hand with an immersion filter lowered into the resin charge and on the other hand with the multi-way valve.

The hardness detector which dips into the resin charge of the softener is without any hydromechanical connection and is traversed, over a substitute path, by a part of the water flowing in the resin charge. The hardness detector furthermore has a built-in electric switch which is connected with an electric valve control via an at least two-wire cable which passes through the resin charge on the outside of the softener. In this way there is created a hardness detector which is of particular by simple arrangement connection, and which is suitable even for slight pressure gradients in the resin charge of the softener.

The resin detector has a cylindrical housing with two slot filters as its two ends as inlet and outlet, they being arranged above the resin charge and on the lower end of the resin charge, or vice versa. Slot filters, as has been stated, have the advantage that with a correct width of the slot they prevent the passage of the granular resin charge.

By means of an air-filled hollow piston which floats on the resin charge and is displaceable relative to the stationary switch in the housing of the hardness detector, the result is obtained that the switch is actuated indirectly by the displacement of the piston and that the hollow piston itself has sufficient buoyancy to prevent compression of the resin charge.

A reed switch is provided as electric switch and, for the actuating thereof, a permanent magnet fixed to the piston, so that the switch contact lies in an atmosphere of protective gas and cannot corrode in more or less salty water and is actuatable without contact.

The hollow piston is provided with a cylindrical extension to receive the free-hanging reed switch which has passage openings in the vicinity of the piston and the edge of which remote from the piston receives the annular permanent magnet. The passage openings permit the exchange of water between the inside and outside of the extension of the piston serving as magnet holder, which affords the necessary space for the reed switch. The annular magnet leaves space for the relative entrance and departure of the reed switch, which is moved by the piston.

To the lower end of the hardness-detector housing there is screwed an adjustment piston which supports the resin charge. This adjustment piston permits a readjustment of the switch point of the reed switch, which may be necessary if the swelling of the resin is relatively slight, for example if the water has a high chloride content or so-called economy salting is effected for the regeneration.

The hardness detector is suspended from the cable which is fastened on the one side to the housing of the softener and on the other side to the housing of the hardness detector in a manner relieving pull on its wires, by means of two lead-throughs for the cable in the housing. No special suspension is therefore required, without the cable wires being because of this subjected to tension.

The reed switch is suspended from the cable within the hardness detector housing so that disturbing and expensive attachments of the switch to the housing are avoided.

Obviously, some of the above-indicated features of different embodiments can be combined while others are mutually exclusive and can be used only alternatively. Various possibilities of combination can be noted from the illustrative examples.

The invention will be explained below on basis of a complete embodiment of the inventive system shown by way of example in the drawing and several embodiments of hardness detectors for this system in accordance with the invention.

The system of the invention in accordance with FIGS. 1 to 3 and 12 includes a softener 20, two salt containers (reservoirs) 22, a multi-way valve 24, two hardness detectors 26 and 28, a plurality of water conduits still to be designated and an electric control (not shown) for the multi-way valve 24 by means of the hardness detectors 26 and 28, which will be described in detail later herein.

Figure 1:
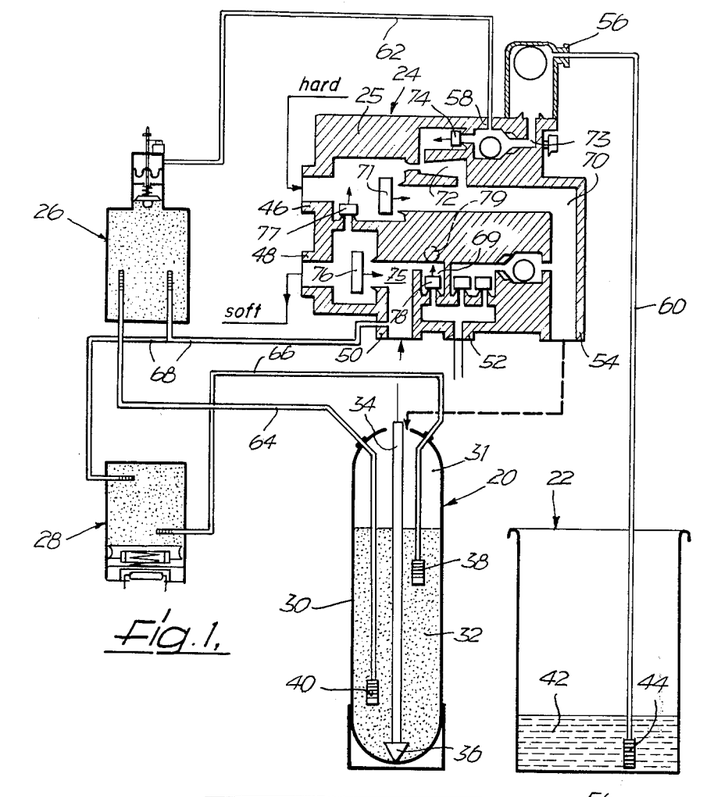
FIG. 1 is a diagrammatically shown overall view of the system with the multi-way valve shown in section.

The softener 20 is a vertical, closed, circular cylindrical tank 30 having a charge 32 of synthetic ion-exchange resin which is regeneratable by Na ions and replaces the Ca and Mg ions of the hard water by Na ions. Along the longitudinal axis of the tank there is a removal tube 34 which is provided with a filter 36 on its lower end which extends down to the bottom of the resin charge 32. At different heights of the resin charge 32 there are two embedded immersion filters 38 and 40 with slots which prevent the passage of resin granules and permit the passage of water.

The salt container 22 is open on top, and on its bottom there is another immersion filter 44, corresponding to the immersion filters 38 and 40, contained in a supersaturated sodium-chloride solution 42.

The multi-way valve 24 has a connection 46 for hard water and a connection 48 for soft water. Furthermore, there are a connection 50 for the removal tube 34, a connection 52 for a waste-water line, a connection 54 for a connecting line, indicated by dashed line, to the space 31 within the tank 30 above its resin charge 32, a connection 56 for a a brine riser line 60 extending from the immersion filter 44 in the salt container 22 and a connection 58 for a vacuum line 62 leading to the hardness detector 26.

The two inlets of the two hardness detectors 26 and 28 are connected via lines 64 and 66 respectively to the associated immersion filters 38 and 40 respectively. The two outlets of the two hardness detectors 26 and 28 are connected via a forked common conduit 68 with the connection 50 for the removal tube 34.

The multi-way valve 24 contains, within its housing 25, a first main channel 70 connecting the connection 46 to the connection 54 and having a controllable valve 71 which is by-passed by an injector 72. The injector 72 and the connection 56 are connected by a first side-channel 73 having a controllable valve 74. Between said valve 74 and the connection 56 there is the connection 58 to the side channel 73. The connections 48 and 50 are connected by a second main channel 75 with a controllable valve 76. The sections of the main channels 70 and 75 located between the connections 46 and 48 on the one hand and the valves 71 and 76 respectively on the other hand are connected with each other via a controllable valve 77. The other section of the second main channel 75 which is located between the valve 76 and the connection 50 is connected with the connection 52 by a controllable valve 78. When the flow valves 74, 77 and 78 are closed, the flow valves 71 and 76 have opened and vice versa, as shown by FIG. 1 for the softening phase and by FIG. 2 for the regeneration phase. The conduit 68 can optionally discharge via a borehole 79 in the housing 25 adjacent the valve 78 into the second side channel 69 containing the valve 78 which connects the second main channel 75 with the connection 52.

Upon the softening, and as long as the valves 74 and 77 are closed, hard water flows via the open valve 71 and the injector 72 through the main channel 70 from the connection 46 to the connection 54, from which the hard water passes into the tank space 31. The collected hard water now trickles through the resin charge 32 of the tank 30 and is softened therein, until it has reached the filter 36 from which it rises as softened soft water in the withdrawal pipe 34. The soft water finally passes from the connection 50, with valve 76 open and valves 77 and 78 closed, via the main channel 75 to the connection 48. At the same time two streams of more or less softened water flow over the lines 64 and 66 respectively into and through the hardness detectors 26 and 28 respectively and from there over the common line 68 at the connection 50 into the main channel 75 so that the test water which flows continuously through the hardness detectors during the softening phase is admixed to the water leaving the softener 20.

Figure 2:
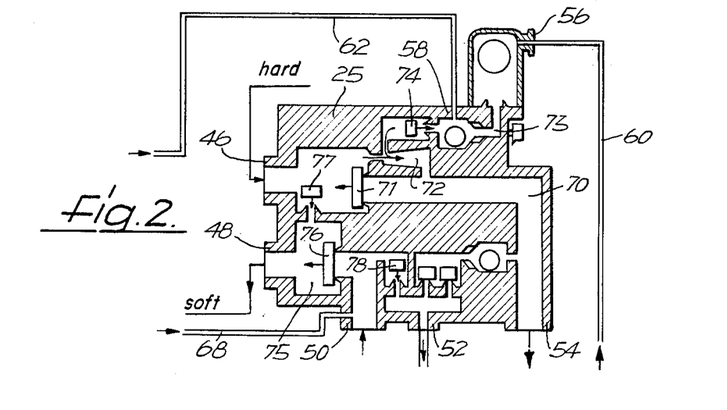
FIG. 2 shows the valve shown in FIG. 1 in a different position.

Also upon the regeneration, hard water flows from the connection 46, with valve 71 closed, over the bypass of the main channel 70 formed by the injector 72, to the connection 54. The injector 72 mixes brine with the hard water, the brine being drawn in by it, with valve 74 open, from the salt container 22 via the side channel 73 and the riser line 60. The mixture of hard water and brine, which has a high content of sodium chloride, passes from the connection 54 into the resin bed 32 of the softener 20, regenerates the latter and then flows via the removal tube 34, with valve 76 closed and valve 78 open, from connection 50 to connection 52. In order that hard water is available at least during the regeneration phase it is provided that a part of the hard water flows from the connection 46, with valve 77 open, to the connection 48. However, if the connection 48 is connected with the storage container for soft water which is not to be mixed with hard water, the valve 77 will be kept closed or the connection between the two main channels 70 and 75 produced thereby will be eliminated. At the same time the regenerating mixture flows along the paths previously described in connection with the softening phase through the two hardness detectors 26 and 28 to the connection 50, so that in addition to the softener 20 the hardness detectors are also regenerated.

All hardness detectors shown in FIGS. 3 to 15 have, as inlets and outlets, line ends 80 which are developed as slot filters. With the exception of the embodiment in accordance with FIG. 12 they extend vertically from below through a housing bottom 81 having the shape of a circular disk into a bed 82, piled thereon, of ion-exchange regeneratable shrink resin which is surrounded laterally by a vertical circular-cylindrical housing shell 83 adjoining the bottom 81, with respect to which the two line ends 80 are arranged diametrically far apart from each other. Only in the case of the embodiment shown in FIG. 12 in which top and bottom are interchanged, the two line ends 80 which lie in a vertical plane containing the axis of the housing bottom 81 extend horizontally at a different height through the housing shell 83 into the resin bed 82. Opposite the housing bottom 81 is an annular or disk-shaped housing cover 84 fastened to the shell 83.

In the case of the hardness detectors shown in FIGS. 3 to 6, 11 and 13 to 15, the housing cover 84 is annular and a vertical cylinder 85 having an upper closure disk 86 is fastened to its inner edge. The cylinder 85 receives in part a portion of the resin charge 82 and has a smaller diameter than the housing shell 83. In the case of the hardness-detector embodiments of FIGS. 3 to 6 and 14, the cylinder 85 is made of a light-transmitting transparent material.

On the free flat horizontal surface 87 of the resin charge 82 there floats, in the embodiment in accordance with FIGS. 3 to 15, a differently developed piston, which will be described below and which also dips in part into the charge.

In the embodiment shown in FIGS. 3 to 10 and 18 there is provided a coil spring 88 acted on in compression, arranged concentrically with respect to the axis of the cylinder 85, the spring resting on one end against the piston and on the other end against the housing of the hardness detector. The coil spring 88 receives centrally a vertical piston rod 89 which is provided on the upper end thereof extending from the housing of the hardness detector with a trip cam 90 which cooperates with the actuating 91 of an electric switch 92 with helps to control the multi-way valve 24 of the system. In the embodiments shown in FIGS. 3 and 7 to 10, the switch 92 is fastened on the housing of the hardness detector, generally on the housing cover 84.

The embodiments in accordance with FIGS. 3 to 6 and 18 are each provided with a device for lifting the piston through actuation of the piston rod 89, the different embodiments being described further below.

Figure 3:
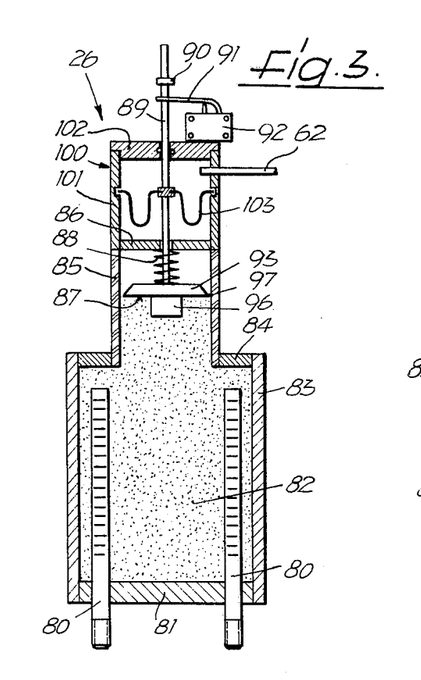
FIGS. 3 and 12 are vertical longitudinal sections through a first and tenth hardness detector, respectively, which form part of the system of FIG. 1.
Figure 4:
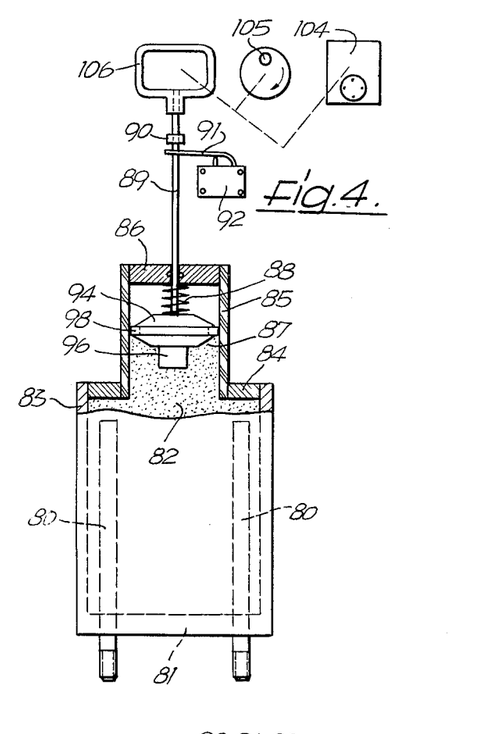
FIGS. 4, 7, 8, 13 and 14 are side views, partially in longitudinal section, of a first, fifth, sixth, eleventh and twelfth hardness detector, respectively.
Figure 5:
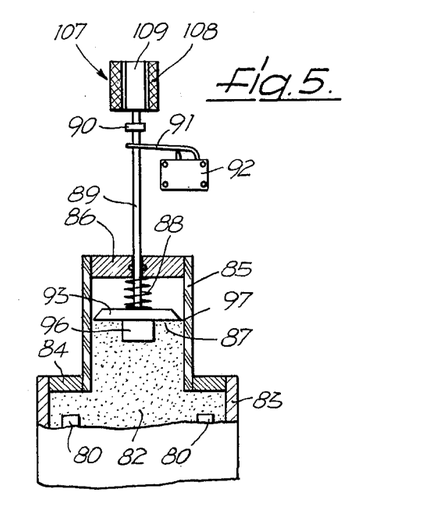
FIGS. 5, 6, 9, 10, 11 and 15 are side views, in partial longitudinal section by themselves of a third, fourth seventh, eighth, ninth and thirteenth hardness detector, respectively.
Figure 6:
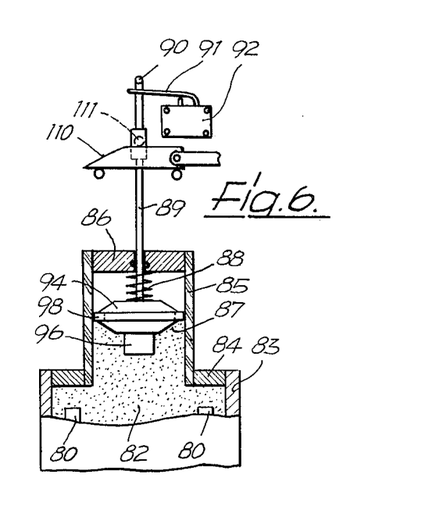
Figure 14:
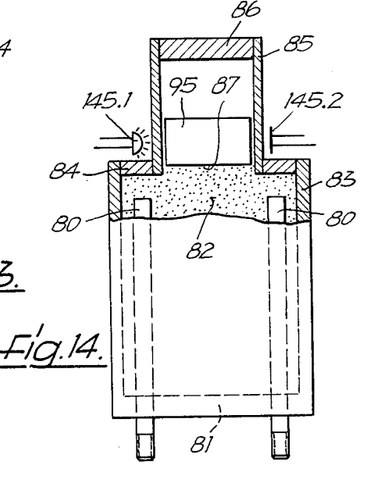
Figure 15:
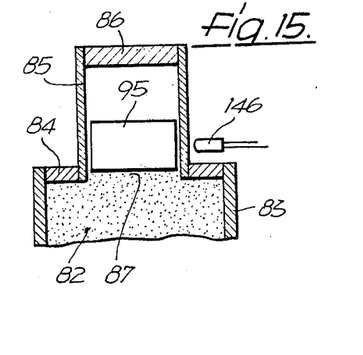

The embodiments in accordance with FIGS. 3 and 5, in accordance with FIGS. 4 and 6, and in accordance with FIGS. 14 and 15 each have the same piston 93, 94 and 95, respectively, which is guided up and down by the cylinder 85. The pistons 93 and 94, which are each directly acted on by the coil spring 88 acting on the closure disk 86, are provided on their bottom with a circular-cylindrical plunger 96 which, in the case of the piston floating on the resin charge 82, dips entirely into said charge and on its surface has an indicator color which is visible when the piston is moving up. The pistons 93 are of frustoconical shape and have a sharp scraping edge 97 adjacent the resin charge 82. On the other hand, the pistons 94 are of double frustoconical shape and have a piston ring 98. The pistons 95 are developed as solid circular cylinders.

In the embodiments of FIGS. 7 to 10, the coil spring 88 acts on the housing cover 84 which is of more or less disk shape.

The piston rods 89 of the embodiments in accordance with FIGS. 3 to 6 are guided in a borehole of the closure disk 86. In the embodiments in accordance with FIGS. 7 to 9 a borehole in the housing cover 84 serves to guide the piston rod 89. In the case of the hardness detector of FIG. 10, the piston rod 89 is not itself guided, as will be explained further below.

The lifting device of the hardness detector 26 has, in accordance with the embodiment shown in FIG. 3, a circular-cylindrical supplementary housing 100 which, by means of its open lower side which is closed by the closure disk 86, sits on the cylinder 85 and consists of a shell 101 and a cover 102 which guides the piston rod 89 by means of a central sealed borehole. The shell 108 secures the circular edge of a watertight undulated membrane 103 whose center is fastened to the piston rod 89 which passes through there, said membrane separating the hollow space in the supplementary housing 100 into an upper part and a lower part, the upper part being connected via the vacuum line 62 to the multi-way valve 24 and the lower part being in communication with the displacement space of the piston 93 via the annular slot formed by the borehole in the closure disk 86 and the piston rod 89.

The manner of operation of this lift device of the hardness-detector embodiment of FIG. 3 is as follows: During the regeneration phase of the system with the hardness detector 26, the vacuum in the line 62 effects a deformation of the membrane 103 and accordingly an upward movement of the piston rod 89 which lifts the piston 93 in opposition to the restoring force of the coil spring 88 so that free space is created for the resin charge 82 which is being regenerated and thus swelling. The swollen resin charge 82 holds on its top, the piston 93, which is finally again floating on it, since the restoring force of the spring 88 is not sufficient to compress the charge.

During the softening phase of the system, the piston 93, under the influence of the spring 88, follows the surface 87 of the shrinking resin charge 82, since no vacuum is present any longer in the line 62 during this phase of operation. Upon the exhausting of the softener 20, the piston 93 has dropped to such an extent that the trip cam 90 actuates the lever 91 of the switch 92.

The purpose of the plunger 96 is—also in the case of the embodiments of FIGS. 4 to 6—to provide an optical indication, by its emergence from the resin charge 82, of the start of the regeneration phase when pistons 93 and 94 respectively and surface 87 of the resin charge 82 start to separate from each other.

In the case of the hardness-detector embodiment of FIG. 4, the lift device consists of an eccentric 105, turnable by a time switch 104, and of a rectangular connecting frame 106 which cooperates with it and is fastened at the upper end of the piston rod 89. At the latest, upon the start of the regeneration phase, the time switch 104, at a predetermined moment, starts to turn the eccentric 105 in the connecting frame 106 by 180°, the piston 94 being lifted, in opposition to the restoring force of the coil spring 88, off from the resin charge 82 and into its upper position of reversal so that the resin charge can swell without interference. At a predetermined time, which is based on empirical values as to the duration of the softening phase, the time switch 104 turns the eccentric 105 by a further 180°, the connecting rod frame 106, supported by the spring 88, lowering the piston 94 until it is firmly supported by the resin charge 82. In this connection the trip cam 90 finally actuates the switch 92 via its lever 91.

The manner of operation of this embodiment corresponds otherwise to that of FIG. 3, also to the extent that there are no differences coming from the development of the lift device. The same also applies to the two embodiments in accordance with FIGS. 5 and 6.

In accordance with FIG. 5, the lift device of the third embodiment of the hardness detector of the invention consists of an electromagnet 107 with armature 109 displaceable in its coil 108 and fastened to the upper end of the piston rod 89. The coil 108 is included in an electric circuit (not shown) which sees to it that the coil is energized at the latest upon the start of the regeneration phase and is deenergized at the earliest at the end of said phase and therefore at the start of a new softening phase. This has the result that the trip cam 90 by means of the lever 91 actuates the switch 92 so as to bring about a new regeneration phase when the piston 93 has dropped sufficiently far on and with the surface 87 of the shrinking resin charge 82, and that the piston moves away from the resin charge 82 as it swells upon the regeneration.

The hardness-detector embodiment of FIG. 6 has a lift device which consists of an incline 110 which is moved horizontally back and forth and of a guide pin 111 which slides up and down on said incline and is fastened to the piston rod 89 transversely to the latter. The action of this lift device corresponds to that of the device in accordance with FIG. 5. However, its actuation is mechanical instead of electrical.

It is possible to actuate the lift device in such a manner that the incline is pulled back from the piston rod 89 so that the piston 94 continuously follows the descending surface of the shrinking resin charge 82.

Figure 7:
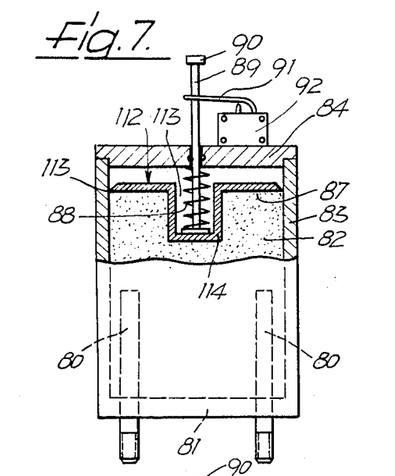

The hardness-detector embodiment shown in FIG. 7 has a disk-shaped piston 112 with sharp scraper edge 113 and with a hollow cylinder 114 with bottom, which screens off a central circular opening 113, the coil spring 88 resting on said bottom.

Here a lift device is dispensable since the swelling pressure of the resin charge 82 acts on a relatively large piston surface and can overcome the restoring force of the spring 88, particularly as the piston 112 is relatively light. In this embodiment, the piston 112 remains in continuous contact with the surface 87 of the resin charge 82 into which its cylinder 114 dips. The switch 92 is therefore actuated by means of the lever 91 by the trip cam 90 as soon as the piston 112 has dropped sufficiently far during the softening phase as a result of the shrinkage of the resin charge 82. This also applies to the embodiments in accordance with FIGS. 8 to 10.

Figure 8:
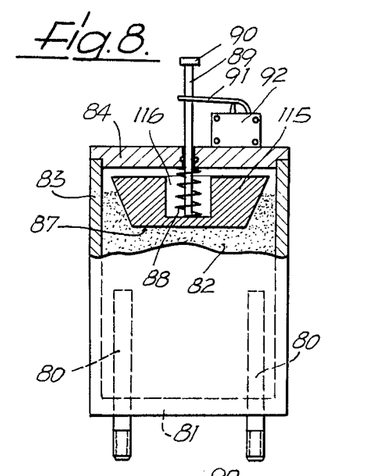

The piston 115 of the hardness-detector embodiment of FIG. 8 is of frustoconical shape, its smaller end surface facing downward and having a central blind hole 116 which receives the coil spring 88 which acts on its bottom.

Figure 9:
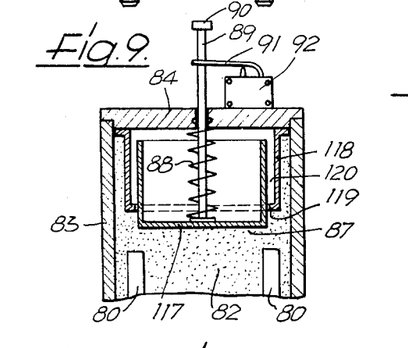
Figure 10:
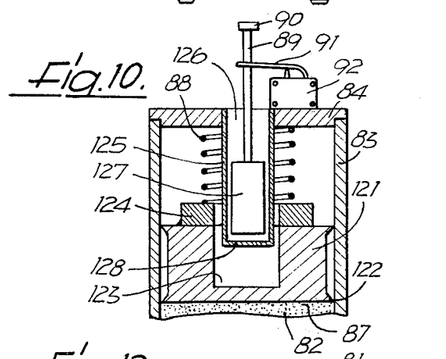

In this case also, in the same manner as in the two following embodiments of FIG. 9 and 10, there is no lift device for the piston.

In the case of the hardness-detector embodiment in accordance with FIG. 9, the piston 117 is formed as a circular cylindrical pot and as a translating part of a telescopic tube, the stationary hollow cylindrical part 118 of which has its flange rim fastened to the housing cover 84. In the same manner as in the case of the two embodiments in accordance with FIGS. 7 and 8, the lower end of the piston rod 89, which bears the coil spring 88, is fastened in the center of the piston on the lowest lying point of the piston.

In the embodiment shown by way of example, the piston 117 is arranged radially within the fixed part 118 of the telescopic tube. However, the reverse arrangement is also possible. In both cases it is necessary that a scraping edge 119 on the fixed part 118 or on the piston keeps grains of the resin charge 82 away from the annular slot 120 between the two telescopic-tube parts in order for the length of the telescopic tube to be variable without obstruction.

As can be noted from the drawing, the swollen resin charge 82 completely surrounds the telescope tube 117, 118 when reduced to its shortest length. However, the only matter of importance is the surface 87 of the resin charge 82 which is acted on by the piston 117.

The special feature of the hardness-detector embodiment of FIG. 10 is that its typical piston 121 with scraper edge 122 not only has a central cavity 123 but also an annular concentric permanent magnet 124 on the top of which the coil spring 88 rests, the spring surrouding a cylindrical tube 125 of non-magnetic material which engages by the permanent magnet 124 into the cavity 123 of the piston 121 and has its upper end fastened in an opening 126 in the housing cover 84. The tube 125 simultaneously guides the piston 121 and the permanent magnet 124 and receives a second permanent magnet guided within it which is fastened to the lower and of the piston rod 89 and cooperates with the radially outer permanent magnet 124 such that the two magnets carry each other along upward or downward. As a stop for the bottom of the cavity 123 in the piston 121 there is provided a circular disk-shaped plate 128 which closes the open lower end of the tube 125.

Figures 11, 12:
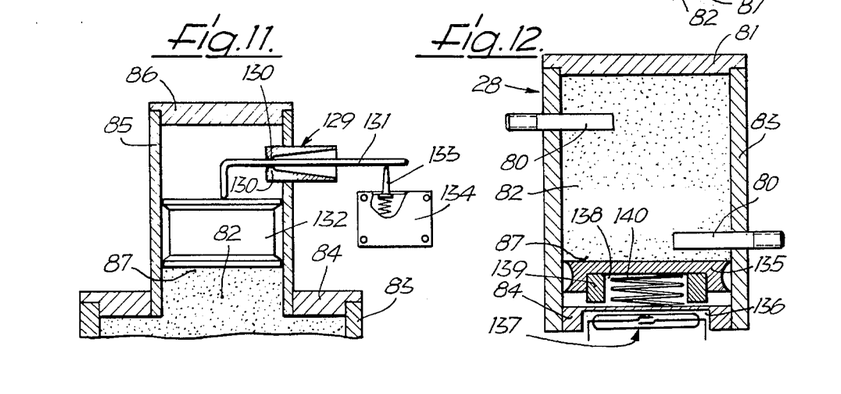
Figure 13:
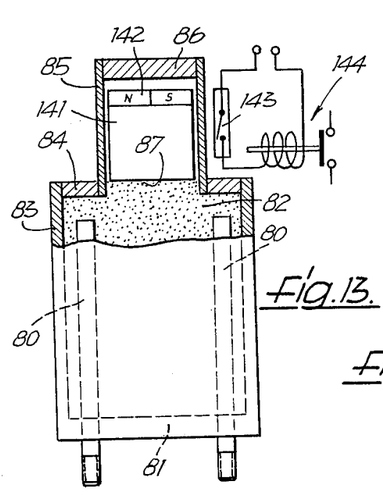

In a radial opening in the cylinder 85 of the hardness-detector embodiment of FIG. 11 there is inserted a sealing and articulation member 129 which, between two horizontal rounded knife edges 130 arranged opposite each other, receives an L-shaped rocker arm 131 of strip material whose short, approximately vertically downward pointing arm is rounded at its end and rests loosely on a drum-shaped piston 132, while its long approximately horizontal arm has its free end, located outside the cylinder 85, resting against the spring-mounted push member 133 of an electric switch 134, also in loose manner. In this connection the spring action of the push member 133 produces on the lever 131 a tilting moment which tends to push the piston 132 vertically downward. This moment is opposed by the swelling pressure exerted in a vertically upward direction by the resin charge 82 via its surface 87 on the piston 132. Depending on whether the resin charge 82 shrinks and swells, the spring action or the swelling predominates, so that the piston 132 always remains in contact with the resin charge. As soon as the push member 133 has carried out a sufficiently long forward or return stroke, the switch 134 is actuated.

In the case of the embodiment of the hardness detector shown in FIG. 12, a disk-shaped piston 135 is applied from below against the resin charge 82 which is piled above it and extends upwards to the housing bottom 81. The opposite housing cover 84 is provided on its lower outer side with a recess 136 in which a reed switch 137 is arranged along a diameter of the housing shell 83. The piston 135 also is provided on its bottom with a recess 138 in which there is arranged an annular permanent magnet 139 which protrudes downward and actuates the reed switch 37. In the recess 138 there is concentrically arranged a coil spring 140 acted on by pressure which rests on top against the bottom of the depression 138 of the piston 135 and at the bottom against the inner side of the housing cover 84 which lies opposite the bottom of the depression 136 of said cover.

Upon the shrinking of the resin charge 82, the coil spring 140 expands, it holding the piston 135 against the top surface 87 of the resin charge and removing the permanent magnet 139 from the reed switch 137 so that the latter finally opens. Upon the swelling of the resin charge 82, the coil spring 140 is compressed by the swelling force which acts via the piston 135, the permanent magnet 139 coming closer to the reed switch 137 and finally closing it.

In a variant of this embodiment, the permanent magnet could be arranged as a bar magnet below the housing bottom 81 and be held there by means of a bar extending up from the piston. Accordingly, the reed switch would have to be arranged in an outer recess of the housing bottom 81.

It would also be possible to modify the embodiment so that the housing specific to the hardness-detector embodiments of FIGS. 4 and 6 is used and a piston with permanent bar magnet arranged on its bottom is arranged over the tapered column of resin charge, the bar magnet cooperating with a reed switch introduced radially through the housing shell (83) laterally on the foot of the cylinder (85) arranged thereon.

The hardness-detector embodiment of FIG. 13 again has substantially the same housing as the embodiments in accordance with FIGS. 3 to 6 and 11. In a cylinder 85 which is not necessarily transparent but is non-magnetic, a circular-cylindrical piston 141 rests on the surface 87 of the resin charge 82 being guided by it, there being mounted on said piston a bar-shaped permanent magnet 142 which cooperates with a magnetically actuatable electric switch 143 outside the cylinder 85. The switch 143 is contained in a circuit having a source of current (not shown) and a relay 144 which is attracted upon the lowering of the piston 141 and released upon the rising thereof so that usable control pulses can be produced when the resin charge 82 shrinks or swells. In order to prevent a north-south alignment in the magnetic field of the earth, the bar magnet 142 can be replaced by a magnet having the shape of a circular disk with concentric poles.

In the case of the hardness-detector embodiment of FIG. 14, the light-pervious cylinder 81 is provided with a light gate 145 whose source of light 145.1 and photocell 145.2 are arranged diametrically opposite each other on the outside of the cylinder 85. If the piston 95 which is guided by the cylinder 85 and rests on the surface 87 of the resin charge 82 descends upon the shrinking of the resin, it then interrupts the light gate 145, as shown. On the other hand, if it rises upon the swelling of the resin then it releases this light gate 145.

The special feature of the hardness-detector embodiment of FIG. 15 resides in the fact that the cylinder 85 is non-metallic but the piston 95 is metallic so that through the cylinder it can actuate an electric switch 146 which responds to changes in capacitance. This is done in one direction or the other when the tapered column of the resin charge 82 lifts the piston 95 out of the region of influence of the switch 146 upon swelling and allows it to drop in this region upon shrinkage.

Figure 16:
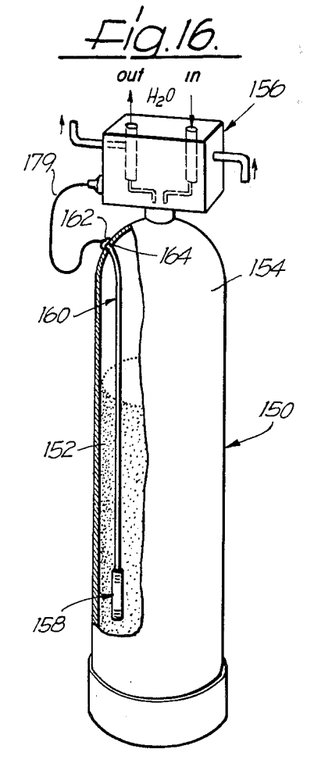
FIG. 16 is a diagrammatic partial view of the system with the softener shown with its covering partially broken away.
Figure 17:
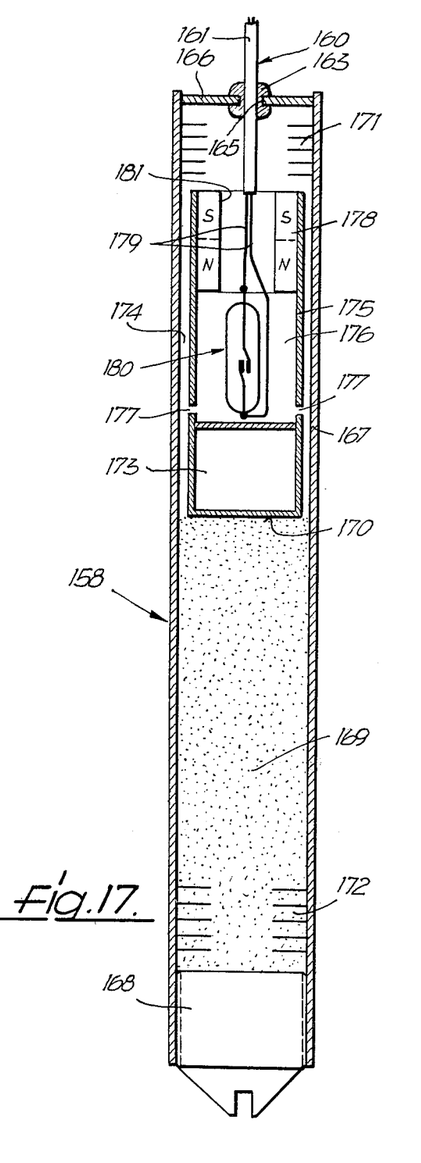
FIG. 17 is a longitudinal section through a fourteenth hardness detector of the system according to FIG. 6.

FIG. 16 shows a variant of the system in accordance with FIG. 1 having an embodiment of the hardness detector which is shown by itself in FIG. 17. A multi-way valve 156, whose functions are merely indicated here, is placed on a softener 150 with resin charge 152 at the place where the riser tube, not shown, emerges from the housing 154.

As immersion unit there is lowered into the resin charge 152 of the softener 150 the hardness detector 158 which is suspended from a cable 160, the insulating shell 161 of which is grasped by two leadthroughs 162 and 163 which are arranged in suitable openings 164 and 165, respectively, of the softener housing 154 or of a housing cover 166 of the hardness detector 158. The opening 164 on the softener 150 lies on top in the vicinity of the multi-way valve 156 and therefore above the resin charge 152 and at the riser tube.

The hardness detector 158 has, as housing 167, a circular-cylindrical, relatively long tube, the upper end of which is closed by the aforementioned cover 166 and into the lower end of which an adjustment piston 168, which can be adjusted by means of a screwdriver, is screwed. On this piston there is packed a charge 169 of shrink resin whose flat horizontal surface 170 lies at a greater distance from the housing cover 166. At its upper and lower ends and therefore below the housing cover 166 and above the adjusting piston 168 respectively the shell of the housing 167 is provided with slot filters 171 and 172, respectively, which are formed simply by slots, the width of which prevents emergence of the resin granules. On the surface 170 of the resin charge 169 there is a floating air-filled hollow piston 173 in the form of a circular cylinder whose outside diameter is smaller than the inside diameter of the housing 167 by an amount more than merely the tolerance, so that an annular slot 174 is formed between same for the passage of water. On the piston 173 there is seated a cylindrical extension 175 corresponding to it and having a hollow space 176 which is open on top and at its bottom has a plurality of flow openings 177 so that water can enter into the hollow space 176 from the annular slot 174 and pass from the hollow space into the annular slot. Within the hollow space 176 at the upper end of the extension 175 there is an annular permanent magnet 178 which is fastened on the inside at the upper edge of the extension. Through the magnet 178 there extend two wires 179 of the cable 160, which wires extend from the insulating shell 161 and are themselves insulated, they being connected at their end to a reed switch 180 which stands on edge and fits in the opening 181 of the permanent magnet 178 by which it is actuated upon relative approach in the sense of the connection of the wires 179 and is actuated when the opening of the magnet surrounds the switch. In order for this to be possible, the spacing between the permanent magnet 178 and the hollow piston 173 is greater than the height of the reed switch 180, which is located in the intervening part of the hollow space 176, determined when the resin charge 169 is swollen to maximum extent as shown in FIG. 17 and the softener 150 therefore has just been regenerated or has been started to be used for softening.

The manner of operation of the hardness detector 158 is as follows: The hollow piston 173 rests continuously on the surface 170 of the resin charge 169. If the latter, starting from the position in accordance with FIG. 17, upon the softening, during which hard water flows not only through the resin charge 152 of the softener 150 but also through the resin charge 169 of the hardness detector 158 contained in the softener, namely inwards in the case of the slot filter 171 and outwards in the case of the slot filter 172; to repeat, therefore, if the hardness-detector resin charge 169 shrinks, the piston descends with the surface 170, in which connection finally the permanent magnet 178 actuates the reed switch 180 after approach. During the regeneration phase, the hardness-detector resin charge 169 swells, the hollow piston 173 rising with the surface 170 of the resin charge and the actuation of the reed switch 180 by the permanent magnet 178 being finally eliminated upon moving away. By means of the connect and disconnect pulses the regeneration phase is started and stopped respectively via the cable 160 which is connected for the electric valve control to the multi-way valve 156.

Figure 18:
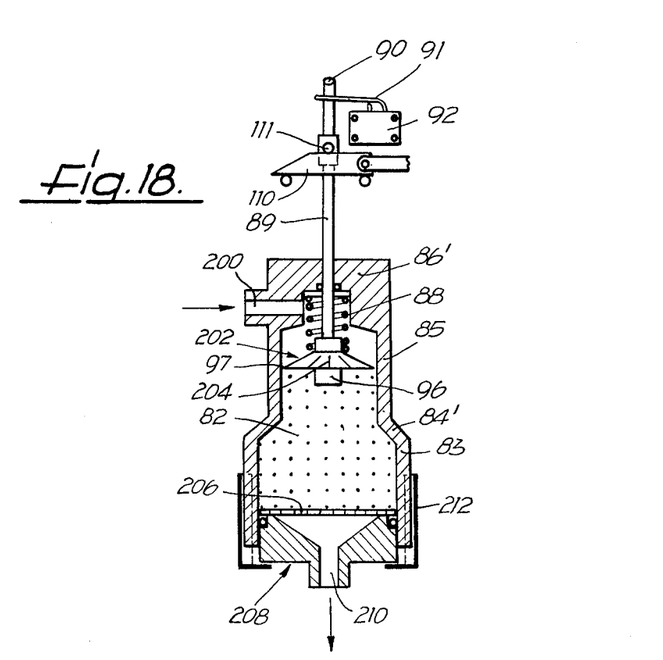
FIG. 18 is a complete vertical longitudinal section through a fifteenth hardness detector similar to that shown in FIG. 6.

The fifteenth and last embodiment of the hardness detector in accordance with FIG. 18 of the invention is provided with the lift device for the hardness-detector embodiment in accordance with FIG. 6 and differs from the latter in the manner that the housing shell 83, a conical housing cover 84', the cylinder 85 and a closure part 86' are developed as a single, integral unit, that the resin charge 82 is traversed from above by test water, and that for this purpose the closure part 86' has a horizontally drilled inlet 200 and the piston 202 which is cylindrical on top for the supporting of the coil spring 88 and frustoconical in the middle (above the plunger 96) has openings in the form of slots 204 which permit water to pass but retain resin granules, and the housing shell 83 receives a slotted filter disk 206 which support the resin charge 82 at an adjustable height. For the adjustment of the height there is used a supporting part 208 of funnel shape which is guided vertically in the lower end of the housing shell 83 with a seal, said part extending out of said end and engaging by means of its outlet 210 through a cap nut 212 which is screwed onto said end. By turning the nut 212, the vertical position of the filter disk 206 which is supported from below only at its edge by the supporting part 208 can be adjusted.

Finally, it may be mentioned that the floating or suspending of the hollow portion 173 on the surface 170 of the resin charge 169 naturally presupposes that the specific gravity of the unit consisting of hollow piston, its extension 175 and magnet 178 which rests on the surface is at most as great as the specific gravity of the resin charge. Otherwise, this unit would sink.

What is claimed is:

1. A system for softening water, said system comprising:
   a regeneratable softener having an ion-exchange resin exposable to said water;
   means for introducing water to be softened into said softener;
   a salt reservoir containing a supersaturated sodium-chloride solution for the regeneration of said resin;
   means for transferring supersaturated sodium-chloride solution from the salt reservoir to the softener;
   at least one means for removing softened water from said softener and for removing spent regenerant solution from the softener, respectively;
   a water hardness detector including a housing containing an ion-exchange shrink resin charge regeneratable by said supersaturated sodium-chloride solution, said shrink resin charge being exposable to water having passed through at least a part of said resin in said softener, and said detector further including a piston reciprocable within said housing, said piston contacts a single free surface of said shrink resin charge at least during detection of water hardness;

means for passing the water and said supersaturated sodium-chloride solution, respectively, from the softener to the detector; and means, responsive to the position of said piston, for initiating the regeneration of at least said softener.

2. A system for softening water according to claim 1 wherein said hardness detector includes a filter disk arranged below and supporting said resin charge, said filter disk permitting the passage of water therethrough but prohibiting the passage of shrink resin therethrough, wherein said piston is disposed in the path of fluid communication between a water inlet provided in said housing and said resin charge, wherein said piston is provided with at least one aperture therethrough of a size sufficient to permit the passage of water therethrough but which prohibits the passage of shrink resin therethrough, and wherein said filter disk is disposed in the path of fluid communication between said resin charge and a water outlet provided in said housing.

3. A system for softening water according to claim 1 wherein said hardness detector further includes light generating means and light responsive means disposed on opposite sides of said housing such that the light path between said light generating means and said light responsive means intersects the path of reciprocation of said piston, and wherein said housing portion in the light path is formed of light transmitting material, whereby said piston interrupts light traveling from said light generating means to said light responsive means when said shrink resin charge occupies a space in said housing within a selected volume range.

4. A system for softening water according to claim 1 wherein said hardness detector further includes a resilient member acting on said piston and tending to force said piston against said shrink resin charge.

5. A system for softening water according to claim 1 wherein said piston is generally frusto-conically shaped.

6. A system for softening water according to claim 1 wherein the periphery of said piston adjacent to the region of piston contact with the single free surface of said shrink resin charge is provided with a sharp scraper edge which makes substantially line contact with the interior surface of said housing.

7. A system for softening water according to claim 1 wherein said piston is generally double frusto-conically shaped and the periphery of said piston between the frusto-conical regions is provided with an annular ring which contacts the interior surface of said housing.

8. A system for softening water according to claim 1 wherein said piston is provided with a plunger extension for protruding into said shrink resin charge.

9. A system for softening water according to claim 8 wherein said plunger is colored differently from the remainder of said piston and wherein portions of said housing are transparent such that a person outside said housing may view the piston and readily determine whether said piston is in contact with the single free surface of said shrink resin charge.

10. A system for softening water according to claim 1 wherein said piston is substantially hollow and is provided with a pair of concentrically arranged, telescopic side walls, a first side wall being fixed relative to said housing and the other side wall capable of telescopic reciprocation relative to said first side wall.

11. A system for softening water according to claim 1 wherein said piston is formed in the shape substantially of a disk.

12. A system for softening water according to claim 1 wherein said hardness detector further includes a permanent magnet coupled to said piston for corresponding reciprocal movement therewith and includes an electric switch responsive to a magnetic field of a selected magnitude created by said magnet.

13. A system for softening water according to claim 1 wherein said hardness detector further includes a piston rod operatively connected to said piston and protruding through said housing to the exterior thereof, the protruding portion of said piston rod being operatively connected to an electric switch.

14. A system for softening water according to claim 13 wherein said hardness detector includes means for lifting and piston out of contact with the single free surface of said shrink resin charge and for maintaining said piston above said surface during regeneration of said shrink resin charge.

15. A system for softening water according to claim 14 wherein said lifting means comprises an arm projecting from the protruding portion of said piston rod and a translatable cam for operatively abutting said arm.

16. A system for softening water according to claim 14 wherein said lifting means includes an eccentrically rotatable shaft operatively connected to the protruding portion of said piston rod.

17. A system for softening water according to claim 14 wherein said lifting means includes a selectively activated electromagnet which acts upon a displaceable armature operatively connected to the protruding portion of said piston rod.

18. A system for softening water according to claim 14 wherein said housing of said hardness detector is a fluid tight housing partitioned into two fluid tight chambers by a deformable membrane, said piston rod extending through said housing and attached to said membrane, said hardness detector further including means for creating a pressure differential across said membrane to thereby effectuate displacement of said piston rod.

19. A system for softening water according to claim 1 wherein said hardness detector further includes an electric switch responsive to a capacitance of a selected magnitude created by said piston.

20. A system for softening water according to claim 1, wherein
said piston floats on said free surface.

21. A system for softening water according to claim 1, further comprising
a waste-water line operatively connected to said at least one means, a feed line for hard water operatively connected to said introducing means as well as a discharge line for soft water operatively connected to said at least one means,
said introducing means is an inlet to said softener,
said at least one means is an outlet from said softener,
a plurality of valves are operatively connected to said inlet and said outlet of said softener, to said salt reservoir and to said waste-water line, said plurality of valves forms a multi-way valve means, said multi-way valve means for connecting an outlet of said detector with said discharge line during the detection of the water hardness and for connecting said outlet of said detector with said waste-water line during the regeneration, respectively.

22. The system for softening water according to claim 21, wherein
said multi-way valve means has a valve housing formed with a borehole and an inlet, the latter is connected with said outlet from said softener,
said outlet of said detector is connected to said borehole in said valve housing,
said borehole communicates with said inlet of said multi-way valve means.

23. The system for softening water according to claim 22, wherein
one of said plurality of valves of said multi-way valve means is an outlet valve disposed in a vicinity of and operatively communicating with said waste-water line,
said valve housing of said multi-way valve means is formed with another borehole, said another borehole communicates with said waste-water line in the vicinity of said outlet valve,
said outlet of said detector is operatively connected to said another borehole.

* * * * *